(12) United States Patent
I

(10) Patent No.: US 7,806,422 B2
(45) Date of Patent: Oct. 5, 2010

(54) BICYCLE WITH A COMMON PIVOT SHOCK ABSORBER

(75) Inventor: Simon I, Taichung County (TW)

(73) Assignee: Giant Manufacturing Co. Ltd., Taichung (TW)

( * ) Notice: Subject to any disclaimer, the term of this patent is extended or adjusted under 35 U.S.C. 154(b) by 21 days.

(21) Appl. No.: 12/038,093

(22) Filed: Feb. 27, 2008

(65) Prior Publication Data

US 2008/0277900 A1 Nov. 13, 2008

(30) Foreign Application Priority Data

May 11, 2007 (TW) .............................. 96116880 A

(51) Int. Cl.
*B62K 25/00* (2006.01)
(52) U.S. Cl. ........................................ 280/284; 280/283
(58) Field of Classification Search .......... 280/283–284
See application file for complete search history.

(56) References Cited

U.S. PATENT DOCUMENTS

| 5,611,557 A | * | 3/1997 | Farris et al. | .................. 280/275 |
| 6,886,846 B2 | * | 5/2005 | Carroll | ........................ 280/284 |
| 2005/0253357 A1 | * | 11/2005 | Chang et al. | ................ 280/283 |

* cited by examiner

*Primary Examiner*—Tony H. Winner
(74) *Attorney, Agent, or Firm*—Vierra Magen Marcus & DeNiro LLP

(57) ABSTRACT

A bicycle with a common point shock absorber comprises a bicycle frame and a shock absorber. The bicycle frame comprises a front frame and a rear frame, an upper linkage device and a lower linkage device connected pivotally to the front frame and the rear frame. The shock absorber is mounted in the bicycle frame and comprises a first connecting member connected pivotally to the upper linkage device, and a second connecting member connected pivotally and coaxially to the lower linkage device and the front frame. Thus, assembling the component and the assembly process can be simplified. Convenience for component assembly and repair has been improved. Manufacturing costs are reduced.

14 Claims, 7 Drawing Sheets

BICYCLE WITH A COMMON PIVOT SHOCK ABSORBER

CLAIM OF PRIORITY

This application claims the benefit of Taiwan Patent Application No. 096116880, filed May 11, 2007.

BACKGROUND

1. Field of the Invention

The present invention relates to a bicycle. More particularly, the present invention relates to a bicycle with a common pivot shock absorber.

2. Description of the Related Art

Refer to FIG. 1. Generally, a bicycle 1 comprises a frame 11 and a shock absorber 12. The frame 11 has a seat tube 111, a front triangle 112 connected with the seat tube 111 and extended forwardly, a link 113 mounted pivotally between the seat tube 111 and the front triangle 112, a rear triangle 114 connected pivotally to the link 113 and extended backwardly, and a pair of mounting ears 115 secured on the front triangle 112. The shock absorber 12 comprises a cylinder 121 and a retractable piston rod 122. The cylinder 121 and the piston rod 122 are respectively, pivotally and movably connected to the link 113 and the mounting ears 115 on the front triangle 112 with their opposite ends. Thus, the shock absorber 12 is actuated by the relative motions between the front triangle 112 and the rear triangle 114 and absorbs the amplitude of shocks by retracting operations to provide shock absorbing effects.

However, connecting pivotally the front triangle 112, the rear triangle 114 and the shock absorber 12 together needs not only using the link 113, but also a first pivot point A and a second pivot point B that are located respectively among the rear triangle 114, the seat tube 111 and the link 113, a third pivot point C and a fourth pivot point D that are located respectively among the link 113, the shock absorber 12 and the frame 11, and a fifth pivot point E located between the shock absorber 12 and the front triangle 112. In other words, the aforementioned components have five pivot points, i.e. A to E. Therefore, a large number of pivoting connecters are needed, which brings complex manufacturing procedures, difficult assembly and repair, and high manufacturing costs.

Further, since one end of the cylinder 121 of the shock absorber 12 is pivotally and movably connected to the link 113, and the link 113 blocks the retracting path between the shock absorber 12 and the seat tube 111, the cylinder 121 of the shock absorber 12 will interfere with the link 113 and the seat tube 111 when the cylinder 121 retracts along the retracting path. Thus, the piston stroke is restricted so that the shock absorbing effects are also limited, which renders the suspension system unable to meet the demands.

SUMMARY

An object of the present invention is to provide a bicycle with a common point shock absorber and the bicycle introduces simplified components and assembly procedures.

A bicycle with a common point shock absorber comprises a bicycle frame and a shock absorber. The bicycle frame comprises a front frame and a rear frame, an upper linkage device and a lower linkage device connected pivotally to the front frame and the rear frame. The shock absorber is mounted in the bicycle frame and comprises a first connecting member connected pivotally to the upper linkage device, and a second connecting member connected pivotally and coaxially to the lower linkage device and the front frame.

The bicycle with the common point shock absorber has the advantages and effects as follows. The shock absorber, the lower linkage device and the front frame are connected pivotally and coaxially together, thus, assembling the component and the assembly process can be simplified. Convenience for component assembly and repair has been improved. Manufacturing costs are reduced.

One embodiment includes a bicycle frame and a shock absorber. The bicycle frames comprises a front frame that includes a seat tube, a rear frame, an upper linkage connected pivotally to the front frame and the rear frame, and a lower linkage connected pivotally to the front frame and the rear frame. The lower linkage includes two arms. The seat tube is positioned between the two arms. The shock absorber comprises a first connecting member and a second connecting member. The first connecting member is pivotally connected to the upper linkage. The second connecting member is coaxially and pivotally connected to the lower linkage. The second connecting member is pivotally connected to the front frame. In one implementation, the lower linkage is not connected to the seat tube.

One embodiment includes a bicycle frame and a shock absorber. The bicycle frames comprises a front frame that includes a bottom bracket, a rear frame, an upper linkage connected pivotally to the front frame and the rear frame, and a lower linkage connected pivotally to the front frame and the rear frame. The shock absorber comprises a first connecting member and a second connecting member. The first connecting member is pivotally connected to the upper linkage. The second connecting member is coaxially and pivotally connected to the lower linkage. The second connecting member is pivotally connected to the bottom bracket. In one implementation, the lower linkage includes two arms, and the two arms and the second connecting member are pivotally connected to the front frame at the bottom bracket.

One embodiment includes a front frame, a rear frame, an upper linkage, a lower linkage and a shock absorber. The front frame includes a down tube, a top tube and a seat tube. The seat tube comprises a single tube shape. The upper linkage is pivotally connected to the front frame and the rear frame. The lower linkage is pivotally connected to the front frame and the rear frame. The shock absorber comprises a first connecting member and a second connecting member. The first connecting member is pivotally connected to the upper linkage. The second connecting member is coaxially and pivotally connected to the lower linkage. The second connecting member is pivotally connected to the front frame.

One embodiment includes a front frame, a rear frame, an upper linkage, a lower linkage and a shock absorber. The front frame includes a pair of shock absorber mounts. The upper linkage is pivotally connected to the front frame and the rear frame. The lower linkage is pivotally connected to the rear frame. The lower linkage includes two arms that are pivotally connected to the front frame. The shock absorber comprises a first connecting member and a second connecting member. The first connecting member is pivotally connected to the upper linkage. The second connecting member is coaxially and pivotally connected to the lower linkage and pivotally connected to the pair of shock absorber mounts such that the pair of shock absorber mounts are between the two arms and the second connecting member is between the pair of shock absorber mounts.

One embodiment includes a front frame, a rear frame, an upper linkage, and a shock absorber. The rear frame includes two rear triangles, each of which includes a seat stay and a chain stay. The upper linkage is pivotally connected to the front frame and the seat stays of the rear frame. The shock absorber comprises a first connecting member and a second connecting member. The first connecting member is pivotally connected to the upper linkage. The second connecting member is pivotally connected to the front frame. The second connecting member is pivotally and coaxially connected to the chain stays of the two rear triangles.

DETAILED DESCRIPTION

Figure 1:
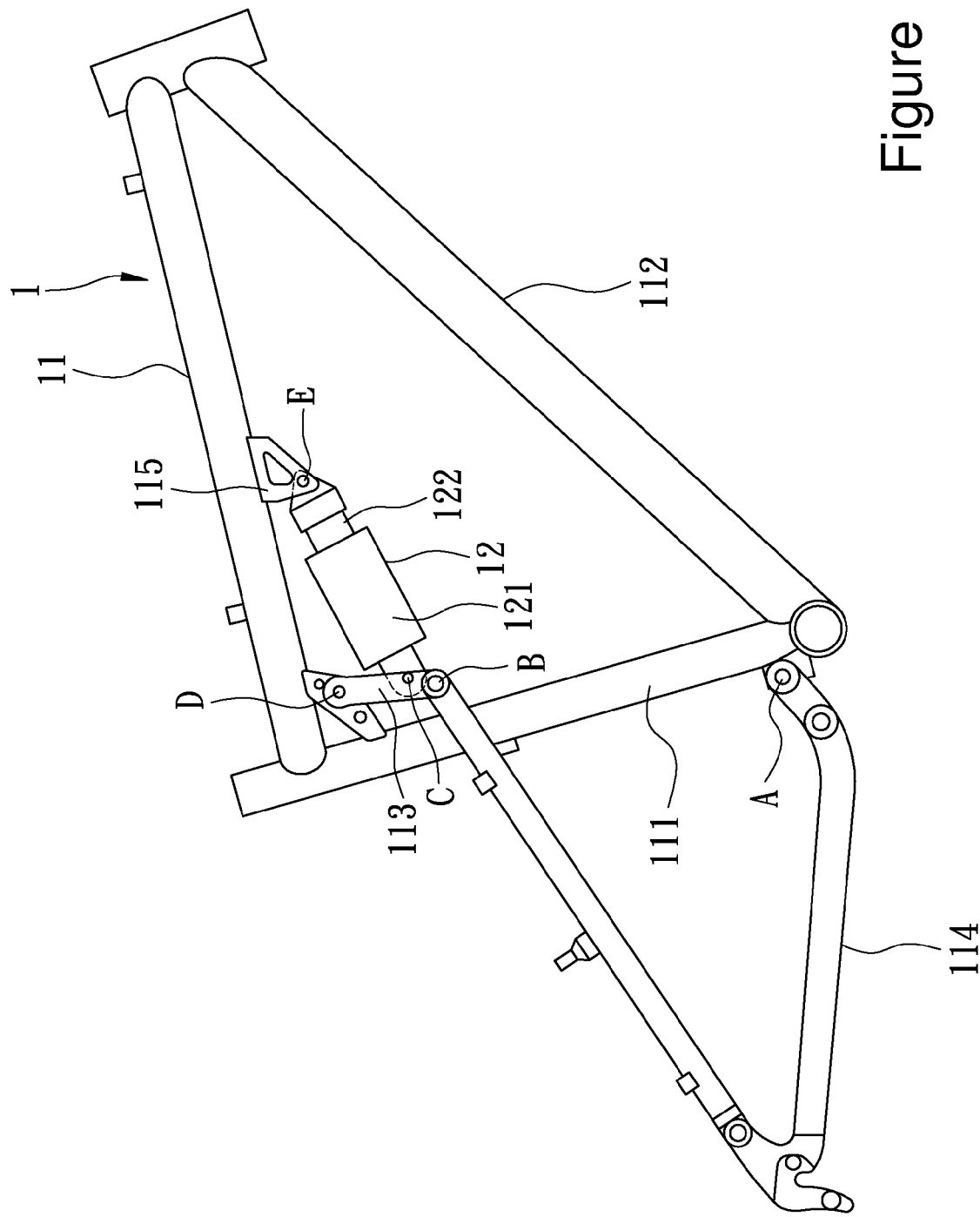
FIG. 1 is a front view of a bicycle with a common point shock absorber in accordance with the prior art.

Reference will now be made in detail to the present preferred embodiments of the invention, examples of which are illustrated in the accompanying drawings. Wherever possible, the same reference numbers are used in the drawings and the description to refer to the same or like parts.

Figure 2:
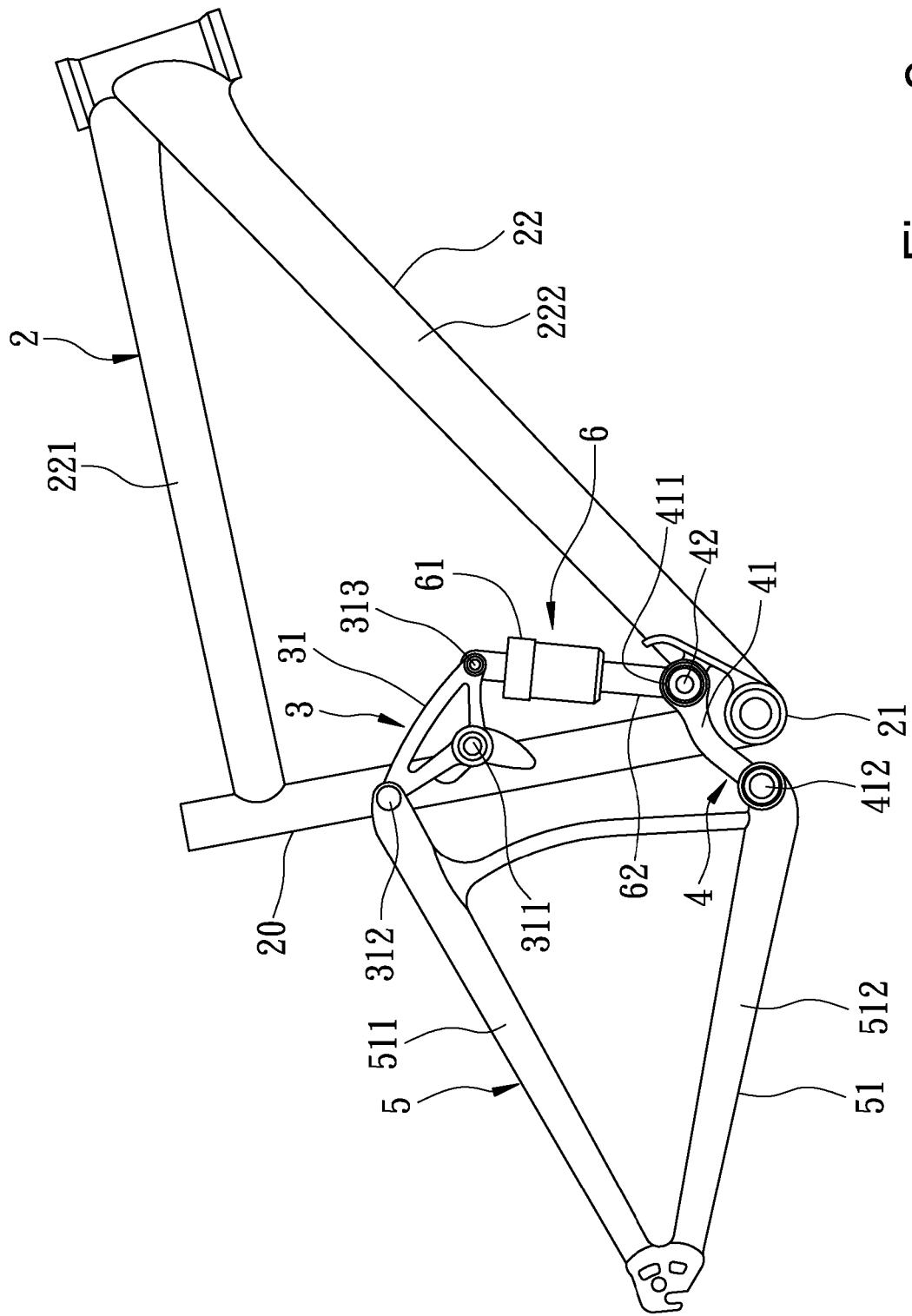
FIG. 2 is front view of a bicycle with a common point shock absorber of a first embodiment in accordance with the present invention.
Figure 3:
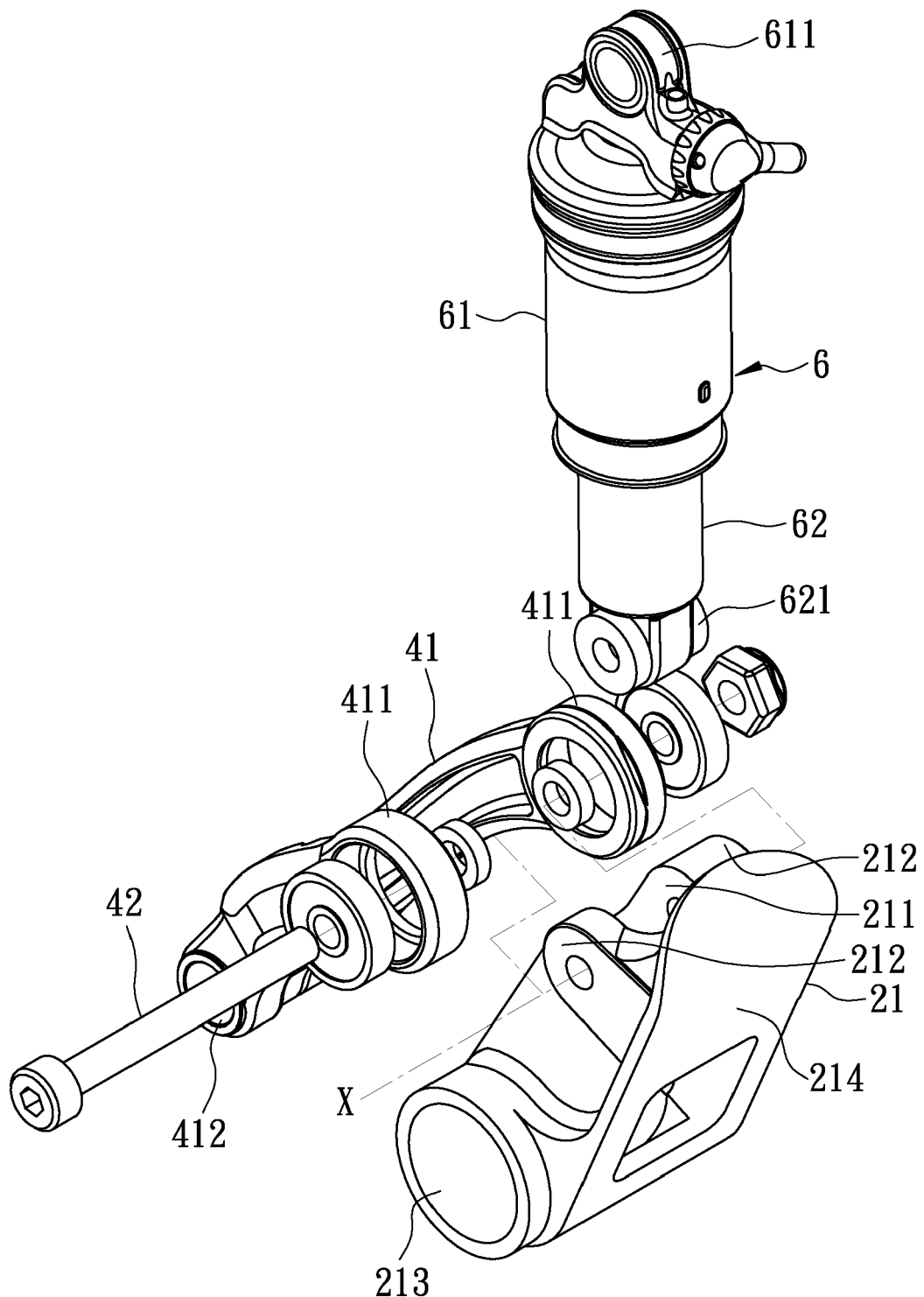
FIG. 3 is an exploded perspective view of the first embodiment.
Figure 4:
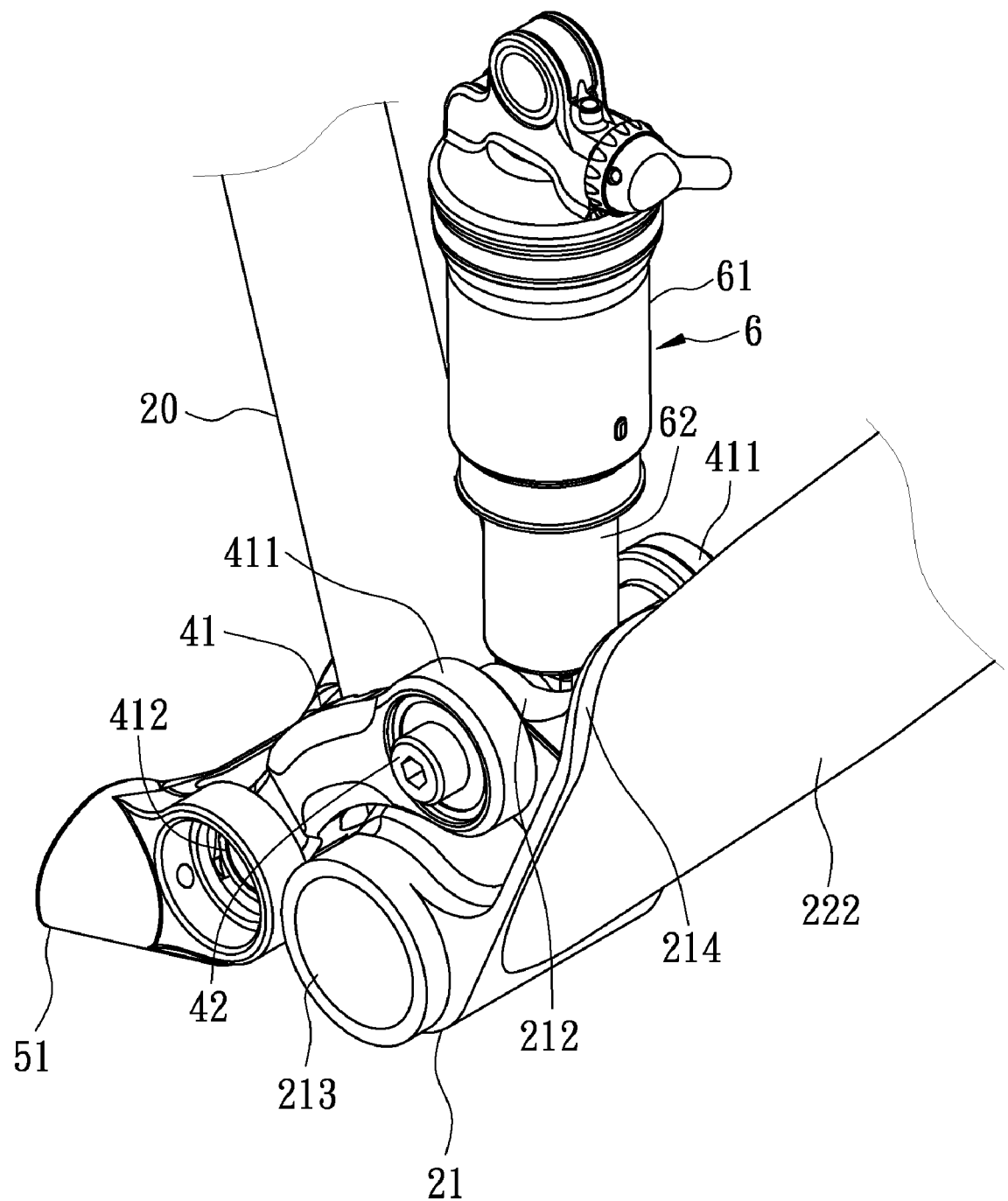
FIG. 4 is a perspective view of the first embodiment.

With reference to FIG. 2, FIG. 3 and FIG. 4. A first embodiment of a bicycle with a common pivot shock absorber comprises a bicycle frame and a shock absorber 6.

The bicycle frame comprises a front frame 2, an upper linkage device 3, a lower linkage device 4 and a rear frame 5.

The front frame 2 comprises a seat tube 20, a bottom bracket 21 mounted securely to a bottom end of the seat tube 20, and a front triangle 22 extended forwardly. The bottom bracket 21 comprises a pair of mounting ears 212 formed on a top surface and defining a slot 211, an axial through hole 213 defined parallel to an axis X, and a connecting surface 214 formed at a side. The front triangle 22 comprises a top tube 221 connected to the seat tube 20, and a down tube 222. The end of the down tube is connected to the connecting surface 214 of the bottom bracket 21.

The upper linkage device 3 comprises two upper links 31 that are substantially arranged in a triangular configuration. Each upper link 31 has a first pivot point 311 connected pivotally with the seat tube 20, a second pivot point 312 located backwardly, and a third pivot point 313 located forwardly.

The lower linkage device 4 comprises a lower link 41 and a fastener 42. The lower link 41 comprises a pair of mounting arms 411 formed at a first end, and a pivoting connection portion 412 defined through a second end parallel to the axis X. The mounting arms 411 are substantially U-shaped, and hold the mounting ears 212 of the bottom bracket 21 in position. Pin 412 provides for arms 411 to be pivotally and coaxially connected to second connecting member 621 of shock absorber 6. Pin 412 also provides for arms 411, ears 212 and second connecting member 621 to be pivotally connected to each other so that ears 212 are between arms 411 and second connecting member 621 is between ears 212.

As can be seen from the Figures, seat tube 20 is depicted in the shape of a single tube and is located between the arms of the lower link 41.

The rear frame 5 is pivotally connected to the front frame 2, extends backwardly and comprises two rear triangles 51 arranged in parallel. Each rear triangle 51 comprises a seat stay 511 connected pivotally to the second pivot point 312 of the upper links 31, and a chain stay 512 connected pivotally to the pivoting connection portion 412 of the lower link 41 about a pivoting center. The pivoting center between the rear triangle 51 and the pivoting connection portion 412 of the lower link 41 is not higher than the bottom bracket 21, and located backwardly towards the rear frame 5.

The shock absorber 6 is mounted between the top tube 221 and the down tube 222 of the front triangle 22 at a location adjacent to the seat tube 20. The shock absorber 6 comprises a cylinder 61 and a piston rod 62 retractably mounted and held in the cylinder 61. The cylinder 61 has a first connecting member 611 formed at its top and connected pivotally to the third pivot point 313 of the upper links 31. The piston rod 62 has a second connecting member 621 held in the slot 211 of the bottom bracket 21 through which the fastener 42 passes through the mounting arms 411 of the lower link 41, the mounting ears 212 of the bottom bracket 21 and the second connecting member 621 of the piston rod 62 along the axis X to connect pivotally and coaxially the lower link 41, the bottom bracket 21 and the piston rod 62 together. The second connecting member 621 of the piston 62 is located at a position over and in front of the bottom bracket 21, and towards the front triangle 22.

When a cyclist rides the bicycle passing over rough roads, pivoting effects are relatively produced between the front frame 2 and the rear frame 5, and the upper links 31 and the lower link 41. The shock absorber 6 is actuated by acting forces of the front triangle 22 and the rear triangle 51 transmitted through the upper links 31, and the lower link 42 and the bottom bracket 21 that are connected coaxially to the piston rod 62. Thus, the actuated shock absorber 6 dampens the jarring sustained in the moving bicycle to provide shock absorbing effects.

Figure 5:
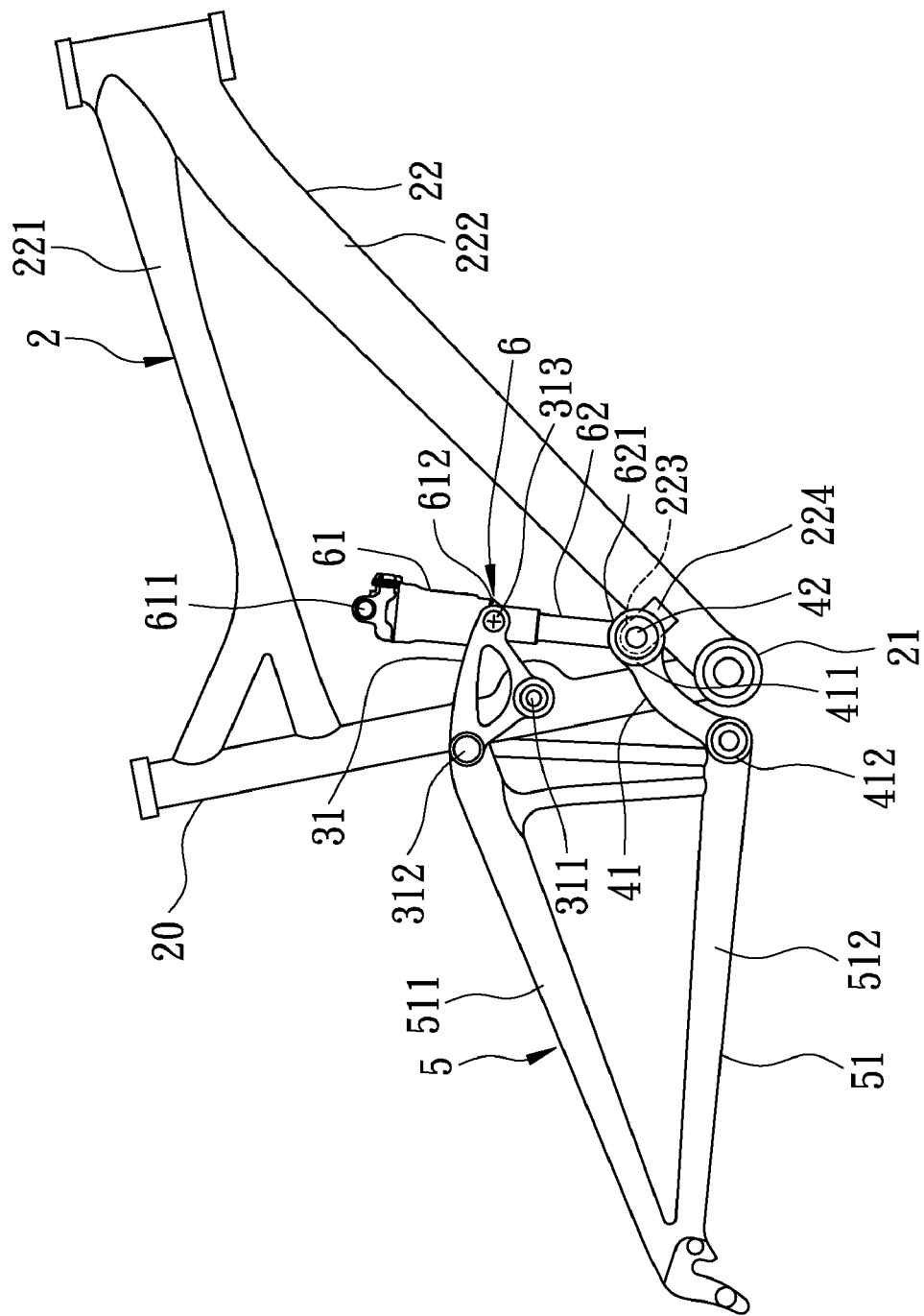
FIG. 5 is front view of a bicycle with a common point shock absorber of a second embodiment in accordance with the present invention.

Refer to FIG. 5. A second embodiment of the present invention is substantially similar to the first embodiment. The modified or different features are described as follows.

The front triangle 22 further comprises a pair of mounting ears 224 formed on the down tube 222 and defining a slot 223 between the mounting ears 224. The second connecting member 621 of the piston rod 62 is pivotally mounted and held in the slot 223, which enables the fastener 42 passing through the mounting arms 411 of the lower link 41, the mounting ears 224 of the down tube 22 and the second connecting member 621 of the piston rod 62. Thus, the lower link 41, the down tube 222 and the piston rod 62 are pivotally and coaxially connected together along their common axis.

The third pivot point 313 of the upper links 31 is pivotally connected to a bottom end 612 of the cylinder 61 of the shock absorber 6.

Since the third pivot point 313 of the upper links 31 is pivotally connected at both sides of the bottom end 612 of the cylinder 61, the third pivot point 313 of the upper links 31 will not interfere with the retractable operations of the shock absorber 6, and are staggered from the retracting path of the shock absorber 6. Therefore, there are quite large space margins existing between the upper links 31 and the top tube 221, or between the first connecting member 611 of the cylinder 61 and the top tube 221. The space margins provide smooth retractable operations of the shock absorber 6, and prevent the shock absorber 6 or the upper link 31 from interference with the top tube 221 during operation.

Figure 6:
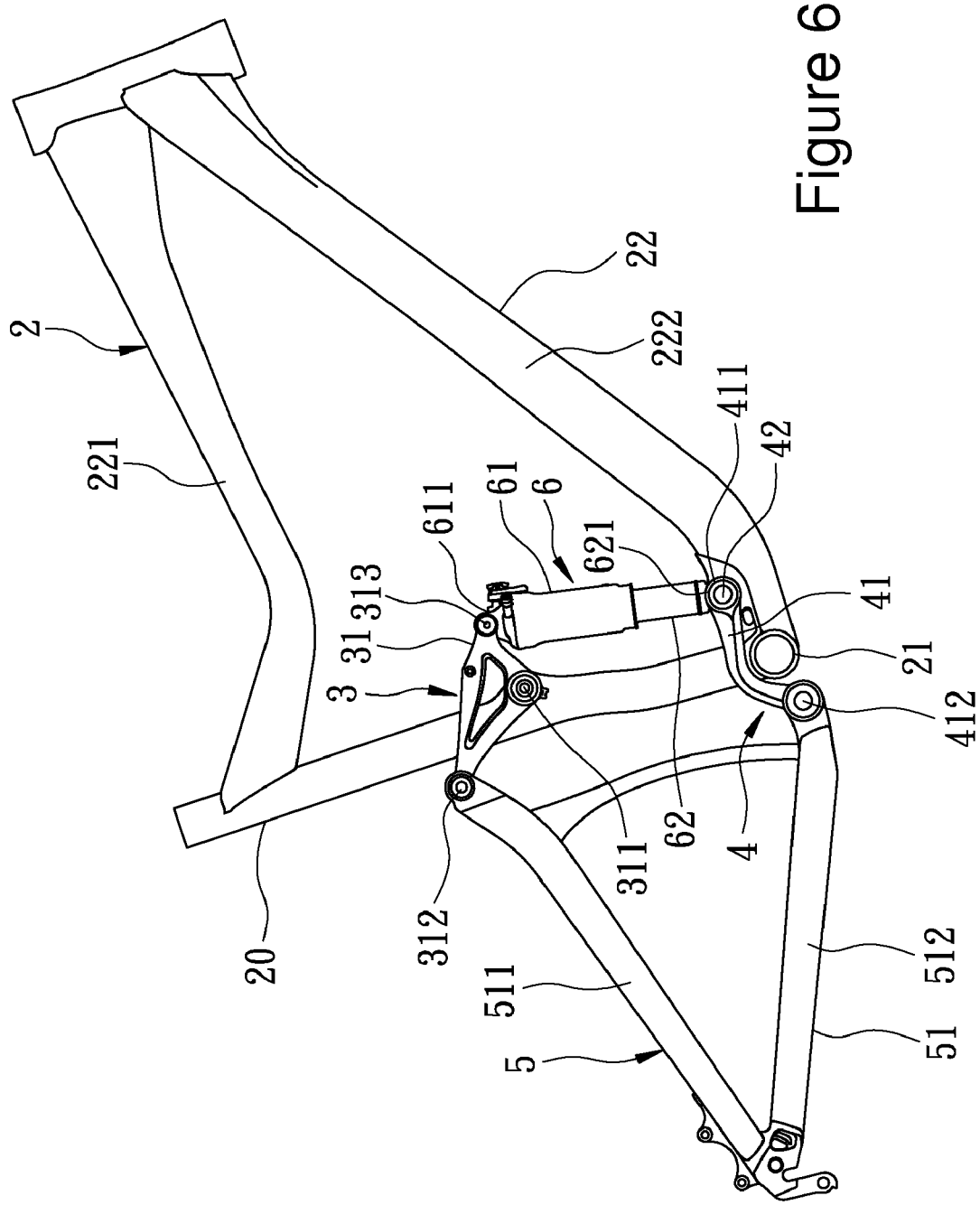
FIG. 6 is front view of a bicycle with a common point shock absorber of a third embodiment in accordance with the present invention.

Refer to FIG. 6. A third embodiment of the present invention is similar to the second embodiment. Similarly, the third embodiment adopts the common axis pivoting connection among the lower link 41, the second connecting member 621 of the piston rod 62 and the down tube 222. The difference is that the third pivot point 313 of the upper links 31 is pivotally connected to the first connecting member 611 of the cylinder 61 of the shock absorber 6.

Figure 7:
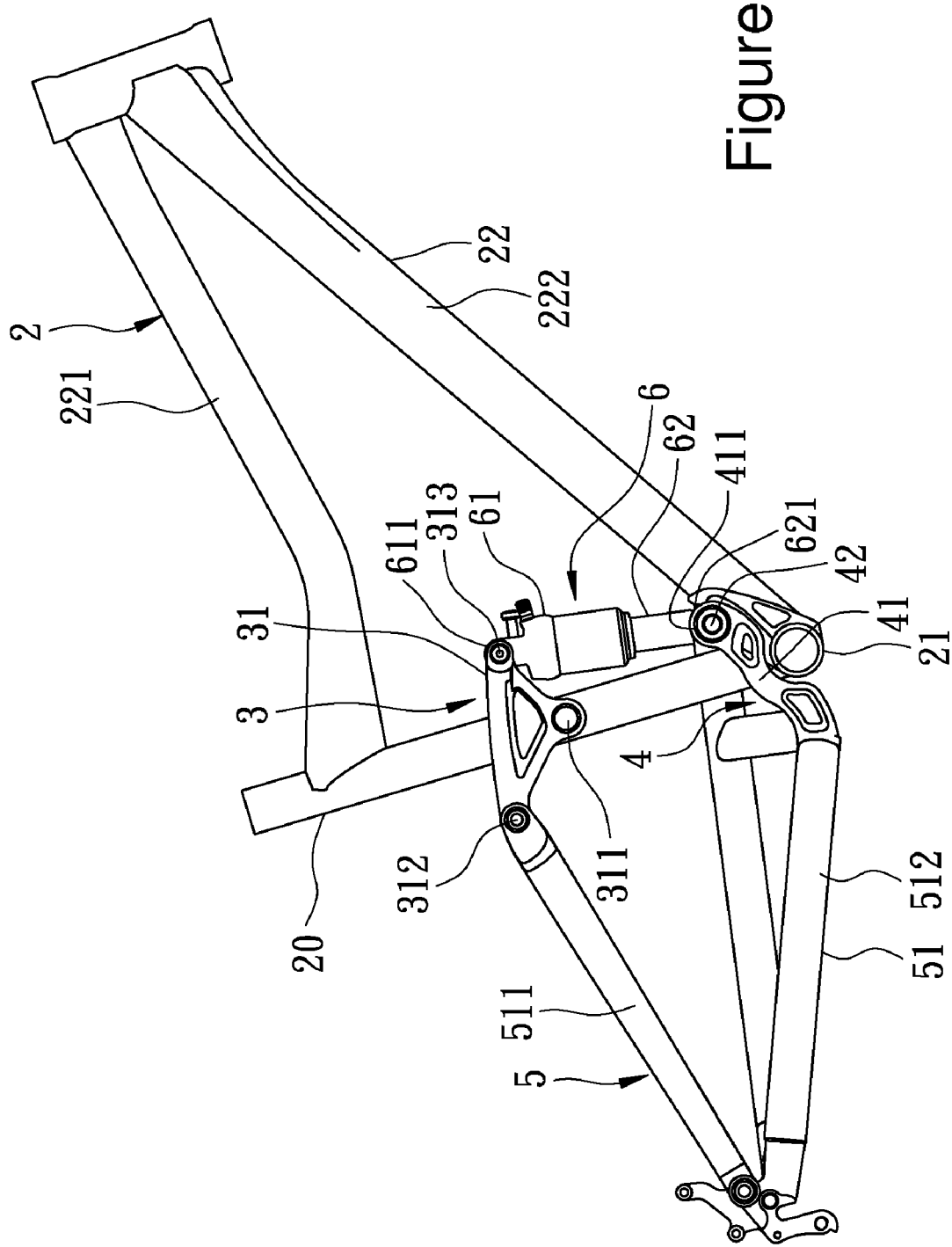
FIG. 7 is front view of a bicycle with a common point shock absorber of a fourth embodiment in accordance with the present invention.

Refer to FIG. 7. A fourth embodiment of the present invention is similar to the second embodiment. The difference is that the bicycle frame omits the rear linkage device. In the embodiment, the chain stay 512 of the rear triangle 51 and the second connecting member 621 of the piston rod 62 are pivotally and coaxially connected on the down tube 22 together along the common axis. Thus, the pivoting effects produced relatively between the front and the rear frame 2 and 5, and the top tube 31 will be able to actuate the shock absorber 6 omitting a pivot point to provide shock absorbing effects.

Consequently, the bicycle with the common point shock absorber has the advantages and effects as follows.

First, the present invention enables the down tube 41, the bottom bracket 21 (or the down tube 222) and the piston rod 62 connected pivotally and coaxially together along the common axis, a pivoting portion and the related pivoting components are not needed to use by comparing with the conventional bicycle. Thus, assembling the component and the assembly process can be simplified. Convenience for component assembly and repair has been improved. Manufacturing costs are reduced.

Second, since the retracting direction of the shock absorber 6 is staggered from the pivoting portion for connecting pivotally the third pivot point 313 of the upper links 31, there are quite large space margins existing between the upper links 31 and the top tube 221, or between the first connecting member 611 of the cylinder 61 and the top tube 221. The space margins prevent the retracting operations of the shock absorber 6 from interfering with the front triangle 22 such that smooth operational motions are improved. In addition, designing the stiffness of the shock absorber 6, and the lever arm between the shock absorber 6 and the bicycle frame becomes more flexible, which elaborates and provides shock absorbing effects.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A bicycle, comprising:
a bicycle frame comprising a front frame that includes a seat tube and a bottom bracket, a rear frame, an upper linkage connected pivotally to the front frame and the rear frame, and a lower linkage connected pivotally to the front frame and the rear frame, the lower linkage includes two arms, the seat tube is positioned between the two arms, the bottom bracket includes two mounting ears and a rod, the rod passes through the two mounting ears and the two arms; and
a shock absorber comprising a first connecting member and a second connecting member, the first connecting member is pivotally connected to the upper linkage, the rod passes through the second connecting member so that the second connecting member is coaxially and pivotally connected to the lower linkage and the second connecting member is pivotally connected to the front frame, the second connecting member is positioned between the two mounting ears.

2. A bicycle according to claim 1, wherein:
the second connecting member is positioned between the two arms.

3. A bicycle according to claim 1, wherein:
the lower linkage is not connected to the seat tube.

4. A bicycle according to claim 1, wherein:
the front frame includes a down tube;
the bottom bracket is positioned at ends of the seat tube and the down tube;
the second connecting member is positioned between the two arms; and
the two mounting ears are positioned between the two arms.

5. A bicycle according to claim 1, wherein:
the seat tube comprises a single tube shape.

6. A bicycle, comprising:
a bicycle frame comprising a front frame that includes a bottom bracket, a rear frame, an upper linkage connected pivotally to the front frame and the rear frame, and a lower linkage connected pivotally to the bottom bracket and the rear frame, the bottom bracket includes two mounting ears and a rod, the rod passes through the two mounting ears and a portion of the lower linkage; and
a shock absorber comprising a first connecting member and a second connecting member, the first connecting member is pivotally connected to the upper linkage, the rod passes through the second connecting member so that the second connecting member is coaxially and pivotally connected to the lower linkage and the second connecting member is pivotally connected to the bottom bracket.

7. A bicycle according to claim 6, wherein:
the front frame includes a down tube, a seat tube and a top tube; and
the bottom bracket is at ends of the down tube and a seat tube.

8. A bicycle according to claim 7, wherein:
the lower linkage includes two arms;
the seat tube is positioned between the two arms;
the lower linkage is not connected to the seat tube; and
the seat tube comprises a single tube shape.

9. A bicycle, comprising
a front frame including a down tube, a top tube, a bottom bracket and a seat tube, the seat tube comprises a single tube shape, the bottom bracket include two mounting ears and a rod, the rod passes through the two mounting ears;
a rear frame;
an upper linkage pivotally connected to the front frame and the rear frame;
a lower linkage, the rod passes through the lower linkage causing the lower linkage to be pivotally connected to the front frame, the lower linkage is also pivotally connected to the rear frame;
a shock absorber comprising a first connecting member and a second connecting member, the first connecting member is pivotally connected to the upper linkage, the rod passes through the second connecting member and the second connecting member is positioned between the mounting ears causing the second connecting member to be pivotally connected to the lower linkage, and the front frame.

10. A bicycle according to claim 9, wherein:

the seat tube is straight.

11. A bicycle according to claim 9, wherein:

the front frame includes a down tube;

the lower linkage includes two arms;

the seat tube is positioned between the two arms; and the lower linkage is not connected to the seat tube.

12. A bicycle, comprising:

a front frame including a bottom bracket, the bottom bracket includes a pair of shock absorber mounts and a rod passing through the shock absorber mounts;

a rear frame;

an upper linkage pivotally connected to the front frame and the rear frame;

a lower linkage pivotally connected to the rear frame, the lower linkage includes two arms that are pivotally connected to the front frame, the rod passes through the two arms; and a shock absorber comprising a first connecting member and a second connecting member, the first connecting member is pivotally connected to the upper linkage, the rod passes through the second connecting member so that the second connecting member is coaxially and pivotally connected to the lower linkage and pivotally connected to the pair of shock absorber mounts, the pair of shock absorber mounts are between the two arms and the second connecting member is between the pair of shock absorber mounts.

13. A bicycle according to claim 12, wherein:

the front frame includes a down tube and a seat tube;

the bottom bracket is at ends of the down tube and the seat tube; and the seat tube is single tube shape.

14. A bicycle according to claim 12, wherein:

the front frame includes a down tube, the bottom bracket at an end of the down tube.

* * * * *